United States Patent
Moline et al.

(10) Patent No.: US 12,312,072 B2
(45) Date of Patent: May 27, 2025

(54) AIRCRAFT WHEEL HAVING DRIVING LUGS

(71) Applicant: SAFRAN LANDING SYSTEMS, Velizy-Villacoublay (FR)

(72) Inventors: Sylvain Moline, Vélizy (FR); Yannick Tarnowski, Vélizy-Villacoublay (FR); Cédric Roulon, Vélizy (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 37 days.

(21) Appl. No.: 17/914,638

(22) PCT Filed: Mar. 25, 2021

(86) PCT No.: PCT/EP2021/057844
§ 371 (c)(1),
(2) Date: Sep. 26, 2022

(87) PCT Pub. No.: WO2021/191393
PCT Pub. Date: Sep. 30, 2021

(65) Prior Publication Data
US 2023/0123036 A1   Apr. 20, 2023

(30) Foreign Application Priority Data
Mar. 27, 2020   (FR) ...................................... 2003077

(51) Int. Cl.
*B64C 25/32*   (2006.01)
*B64C 25/36*   (2006.01)

(52) U.S. Cl.
CPC ............ *B64C 25/36* (2013.01); *B64C 25/405* (2013.01)

(58) Field of Classification Search
CPC ......... B64C 25/36; B64C 25/405; B60K 1/00; B60K 1/04; B60K 7/00; B60K 7/0007;
(Continued)

(56) References Cited

U.S. PATENT DOCUMENTS 4,778,342 A * 10/1988 Conlow .................. F01D 5/323
  416/193 A
4,797,065 A *  1/1989 Conlow .................. F01D 5/323
  416/213 R
(Continued)

FOREIGN PATENT DOCUMENTS

CA       2835921 A1 *  6/2014 ............ B60B 25/00
CN    202539475 U * 11/2012
(Continued)

OTHER PUBLICATIONS

International Search Report for PCT/EP2021/057844 dated Jun. 7, 2021 [PCT/ISA/210].

*Primary Examiner* — Richard Green
*Assistant Examiner* — Michael A. Fabula
(74) *Attorney, Agent, or Firm* — Sughrue Mion, PLLC

(57) ABSTRACT

An aircraft wheel includes a rim that is secured to a central hub defining an axis of rotation of the wheel. The wheel includes one or more driving pins that extend from the hub, projecting in a direction substantially parallel to the axis of rotation of the wheel so as to cooperate with a driving member for driving the wheel in rotation. The driving pin is distinct from bolts assembling together parts of the wheel.

10 Claims, 4 Drawing Sheets

(58) Field of Classification Search
CPC ...... B60K 2007/003; B60K 2007/0061; B60K 2007/0092
USPC .................................. 180/65.1, 65.51, 65.6
See application file for complete search history.

(56) References Cited

U.S. PATENT DOCUMENTS

| | | | | |
|---|---|---|---|---|
| 5,620,287 | A * | 4/1997 | Pratt | F16B 19/05 411/361 |
| 9,650,131 | B2 * | 5/2017 | Jaber | B60B 25/004 |
| 2011/0284685 | A1 * | 11/2011 | Gilleran | B64C 25/405 244/50 |
| 2011/0297786 | A1 * | 12/2011 | Sweet | B64C 25/405 244/103 R |
| 2013/0015697 | A1 * | 1/2013 | Hall | B64C 25/36 188/264 G |
| 2013/0233969 | A1 * | 9/2013 | Charles | B64C 25/405 74/421 R |
| 2015/0204397 | A1 * | 7/2015 | Edelson | B64C 25/405 192/41 A |
| 2015/0217861 | A1 * | 8/2015 | Cox | F16D 41/16 301/6.2 |
| 2015/0321751 | A1 * | 11/2015 | Mazarguil | B64C 25/405 301/6.2 |
| 2015/0336660 | A1 * | 11/2015 | Edelson | B64C 25/34 244/50 |
| 2016/0039518 | A1 * | 2/2016 | Jaber | B60B 37/10 301/6.2 |
| 2016/0101846 | A1 | 4/2016 | Perkins et al. | |
| 2016/0146252 | A1 * | 5/2016 | von Schleinitz | F16C 33/4682 384/574 |
| 2017/0121014 | A1 * | 5/2017 | Cox | B60K 17/02 |
| 2019/0241014 | A1 * | 8/2019 | Herrmann | B64C 25/36 |
| 2019/0376546 | A1 * | 12/2019 | Pizana | B64C 25/36 |
| 2020/0102069 | A1 * | 4/2020 | Beehler | F16D 65/092 |
| 2022/0126987 | A1 * | 4/2022 | Cox | B64C 25/405 |
| 2022/0388356 | A1 * | 12/2022 | Moline | B60B 21/12 |

FOREIGN PATENT DOCUMENTS

| | | | | |
|---|---|---|---|---|
| CN | 103624242 | A * | 3/2014 | |
| EP | 2955109 | A1 * | 12/2015 | ............. B64C 25/36 |
| EP | 2 982 602 | A1 | 2/2016 | |
| EP | 3 287 652 | A1 | 2/2018 | |
| EP | 3715244 | A1 * | 9/2020 | ............. B60B 23/10 |
| FR | 2996167 | A1 | 4/2014 | |
| FR | 3 070 370 | A1 | 3/2019 | |
| GB | 2524246 | A * | 9/2015 | ............. B64C 25/34 |

* cited by examiner

AIRCRAFT WHEEL HAVING DRIVING LUGS

CROSS REFERENCE TO RELATED APPLICATIONS

This application is a National Stage of International Application No. PCT/EP2021/057844 filed Mar. 25, 2021, claiming priority based on French Patent Application No. 2003077 filed Mar. 27, 2020, the contents of each of which being herein incorporated by reference in their entireties.

The invention relates to the field of motorized wheels and in particular to a wheel of an aircraft landing gear intended to be driven in rotation by a driving device attached to the landing gear. The invention also relates to an aircraft landing gear and an aircraft equipped with such a wheel, and a method for driving in rotation an aircraft wheel.

BACKGROUND OF THE INVENTION

In the field of aviation, provision is now being made to fit aircrafts with a device for driving wheels in rotation so as to enable the aircraft to move on the ground without using its own main aero engines.

It is often a question of rotating a driving member and transmitting the rotational movement of the driving member to the wheel via a linking interface.

An aircraft wheel comprises a rim that is secured to a central hub defining an axis of rotation of the wheel. In order to drive the wheel in rotation, it is known from document FR-A-2,996,167 to provide the rim with a plurality of dogs extending laterally (i.e. in parallel to the axis of rotation), projecting from a periphery of said rim in order to have two parallel faces. The linking interface then comprises forks, each of which being capable of overlapping one of the dogs in order to transmit a rotation torque by pressing the fork on one of the faces of the dog. Such a method for driving an aircraft wheel in rotation has the drawback of requiring a particular rim periphery, and therefore the manufacture of specific rims.

There are also known aircraft wheels comprising two half-rims assembled by means of bolts regularly distributed about the axis of rotation of the wheel, the torque for driving in rotation being transferred to the wheel via the bolts for assembling the rim. If such a method for driving the wheel in rotation does not require modifying the half-rims, it generates considerable forces at the level of the bolts which can call into question the correct assembly of said half-rims.

OBJECT OF THE INVENTION

An object of the invention is to provide a wheel that can be easily coupled to a member for driving it in rotation, and that requires little modification of existing rims.

SUMMARY OF THE INVENTION

In order to achieve this object, the invention provides an aircraft wheel comprising a rim that is secured to a hub defining an axis of rotation of the wheel.

According to the invention, the wheel includes at least one driving pin that extends from the hub, projecting in a direction substantially parallel to the axis of rotation of the wheel so as to cooperate with a driving member for driving the wheel in rotation.

Thus, the wheel can be driven in rotation simply by a driving member that rotates about the same axis of rotation as the wheel and that is provided with an orifice arranged to receive an end portion of the driving pin.

According to a particular characteristic, the driving pin is of a generally cylindrical shape and is force-fitted into a bore in the hub.

In a particular manner, the driving pin comprises a collar forming an abutment against the fitting of said driving pin into the bore.

In a particular manner, the bore includes counterbore inside which the collar is housed.

In a particular manner, the bore comprises a bottom of a rounded shape.

According to another particular characteristic, the wheel comprises a plurality of driving pins symmetrically distributed about the axis of rotation of the wheel.

The invention also relates to a landing gear for an aircraft comprising such a wheel and a device for driving the wheel in rotation including a driving member arranged to cooperate with the driving pin and to transfer a driving torque to the wheel via said driving pin.

According to a particular characteristic, the driving member comprises an orifice arranged to receive an end portion of the driving pin.

In a particular manner, the driving member is screwed onto the hub.

The invention also relates to an aircraft comprising a support structure on which such a landing gear is fixed.

The invention also relates to a method for driving in rotation such an aircraft wheel, wherein a rotational driving torque of the wheel is generated by a driving member and is transferred to the wheel via the driving pin.

BRIEF DESCRIPTION OF THE DRAWINGS

The invention can be better understood in the light of the following description, which is purely illustrative and non-limiting, and should be read with reference to the accompanying drawings, in which.

DETAILED DESCRIPTION OF THE INVENTION

Figure 1:
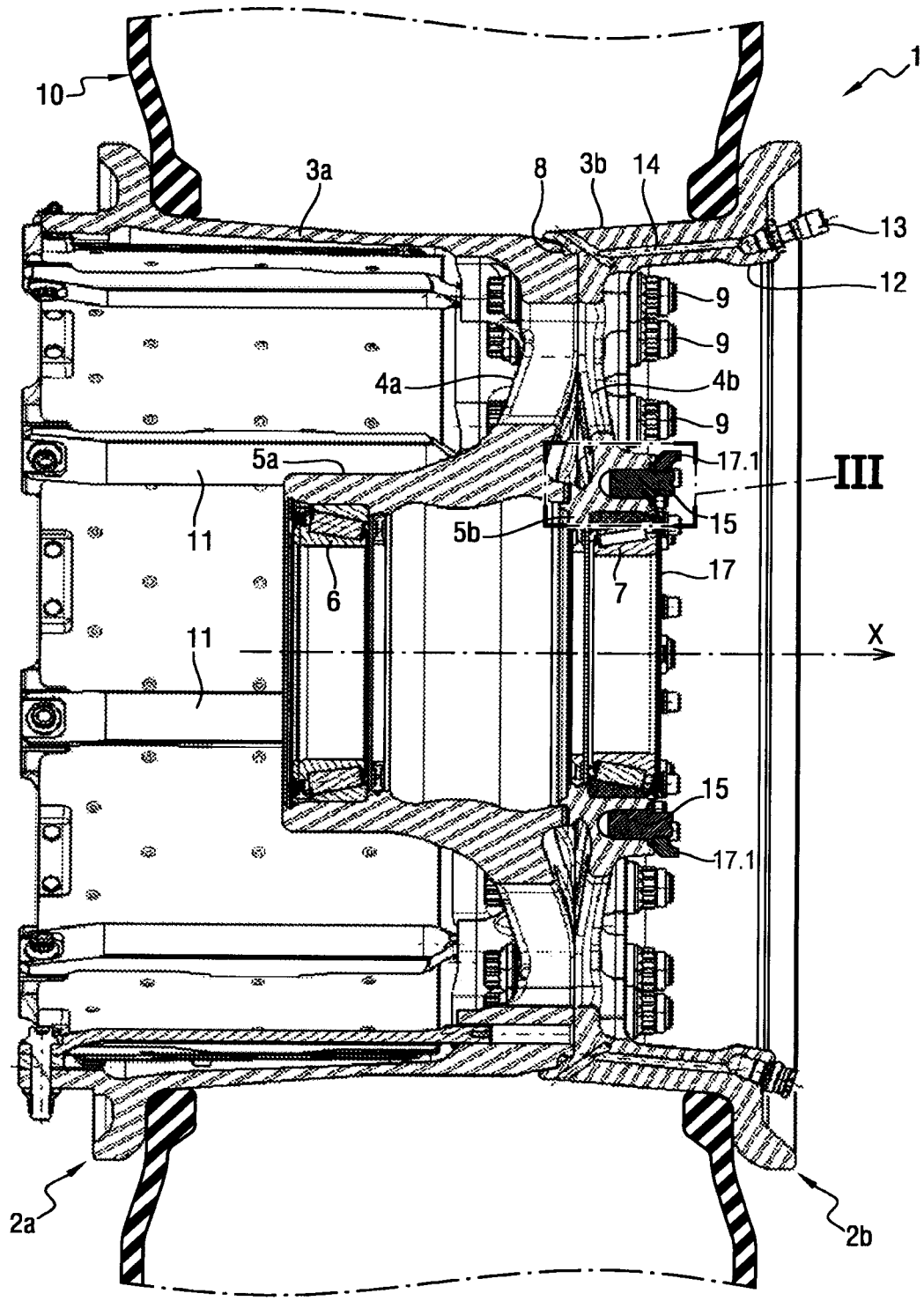
FIG. 1 is an axial section view of an aircraft wheel according to a particular embodiment of the invention.

With reference to FIG. 1, an aircraft wheel 1 comprises, according to a particular embodiment of the invention, two half-wheels 2a, 2b made of aluminium, each half-wheel comprising an annular half-rim 3a, 3b, a half-half-hub 5a, 5b which defines an axis X of rotation of the wheel, and a web 4a, 4b which joins the half-rim 3a, 3b and the half-hub 5a, 5b coaxially with each other. The half-wheel 2a includes a housing formed in the web 4a and in which a sealing gasket 8 is arranged.

The half-wheels 2a, 2b are close together in a direction parallel to the axis X and they include centring surfaces to ensure a correct relative positioning of the half-wheels 2a, 2b. The half-wheels 2a, 2b are held in position by assembly bolts 9 arranged in facing orifices formed in the webs 4a, 4b.

In a manner known per se, the bolts 9 are screwed and tightened in order to assemble together the half-wheels 2a, 2b after a tire 10 has been mounted on the half-rims 3a, 3b. In this position, the sealing gasket 8 is elastically compressed between the half-wheels 2a, 2b, thereby preventing the gas contained in a volume delimited by the tire 10 and by the half-rims 3a, 3b from escaping to the outside of the wheel 1.

Each of the half-rims 3a, 3b has a free annular edge provided with an annular rim flange projecting radially towards the outside of the wheel 1. In a manner known per se, the rim flanges form lateral abutments preventing the tire 10 from running away.

An inside surface of the half-rim 3a extends facing an outside surface of the half-hub 5a and cooperates therewith and with the web 4a to define a space for receiving a stack of brake disks (not shown). The stack comprises both stator disks that do not rotate relative to the axle and rotor disks that have peripheral notches, as indicated by the reference index 11, for receiving bars that are secured to the inside surface of the half-rim 3a. Each bar 11 extends substantially along an axis parallel to the axis X of rotation of the wheel 1.

The half-rim 3b has an inside surface facing an outside surface of the half-hub 5b. A first boss 12 of a substantially rectilinear shape projects from said inside surface of the web 4b towards the free edge of the half-rim 3b in parallel to the axis X so that, when the wheel 1 is viewed along the axis X, the boss 12 defines a receiving surface that locally extends the rim flange and that includes a bore in which an inflation valve 13 is fixed. The bore receiving the valve 13 is extended by a duct 14 allowing the introduction of pressurized gas into the volume delimited by the tire 10 and the half-rims 3a, 3b.

The half-hubs 5a, 5b form a hub that is pivotally received on an axle by means of a bearing 6, 7.

Figure 2:
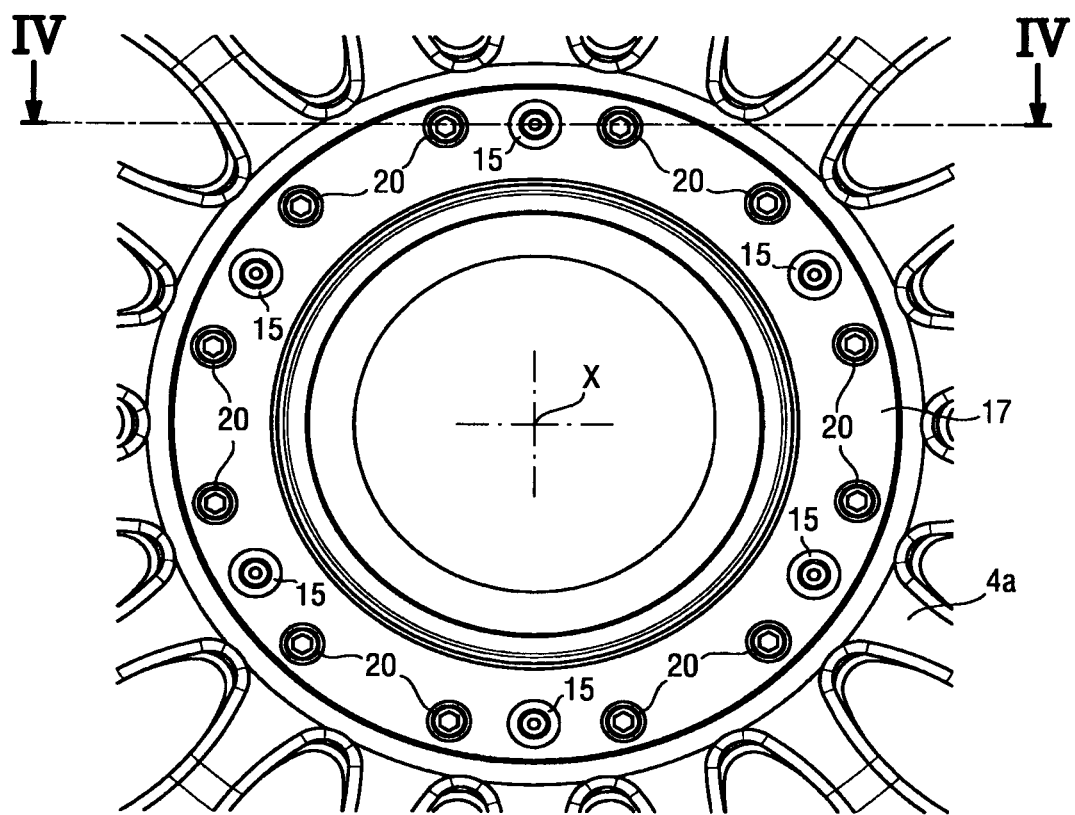
FIG. 2 is a front view of a central portion of the aircraft wheel shown in FIG. 1, showing the distribution of the driving pins about the axis of rotation of the wheel.
Figure 3:
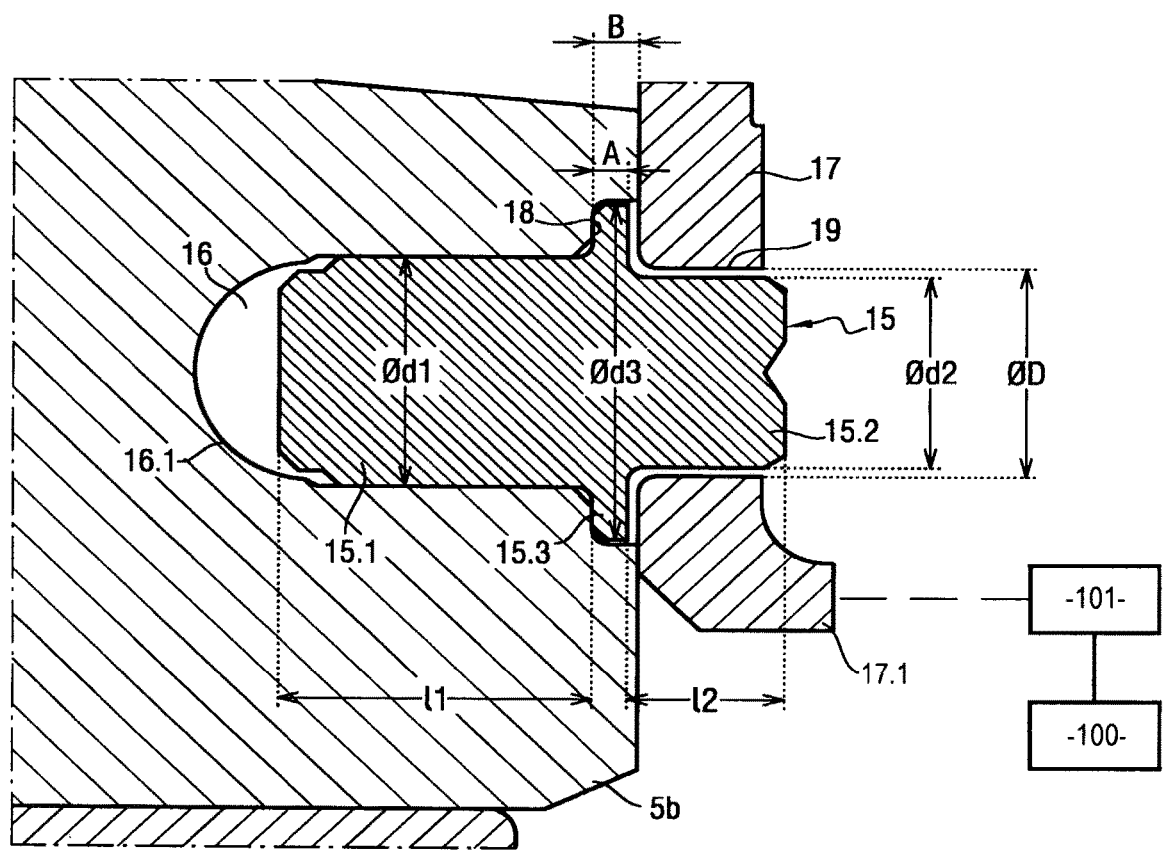
FIG. 3 is a detailed view of the zone III of the aircraft wheel shown in FIG. 1.

With reference to FIGS. 2 and 3, the wheel 1 comprises six driving pins 15, of a generally cylindrical shape, which project laterally from the half-hub 5b in a direction substantially parallel to the axis X of rotation of the wheel 1. The pins 15 are symmetrically distributed about the axis X and are each force-fitted in a bore 16 of the half-hub 5b.

The pins 15 are made in a single piece of an alloy of nickel and chromium such as that produced under the Inconel® brand by the company Special Metals Corporation. Each pin 15 comprises a first cylindrical portion 15.1 and a second cylindrical portion 15.2 between which a collar 15.3 is provided.

The first portion 15.1 and the second portion 15.2 respectively constitute a zone for fitting the pin 15 into the bore 16 and a zone for coupling the pin 15 with a first dog 17. The first portion 15.1 has a diameter d1 slightly greater than the diameter of the bore 16 and has a free end of a smaller diameter to facilitate the centring of the pin 15 in said bore 16. The second portion 15.2 has a diameter d2 smaller than the diameter d1 of the first portion 15.1 and has, along the axis X, a length 11 substantially twice as great as a length 12 of the first portion 15.1 along the same axis.

The collar 15.3 forms an abutment against the fitting of the pin 15 into the bore 16 and bears against a counterbore 18 made at the inlet of said bore 16. The collar 15.3 has a diameter d3 slightly smaller than the diameter of the counterbore 18 and has, along the axis X, a thickness A slightly smaller than the depth B of the counterbore 18 along the same axis, such that the collar 15.3 is housed inside the recess defined by the counterbore 18.

The bores 16 extend in parallel to the axis X from a lateral surface of the half-hub 5b towards the inside of the wheel 1, and comprise a rounded bottom 16.1 so as to reduce the stress concentration at said bores 16 and thus limit cracking starts.

The first dog 17 comprises a circular plate pressed against the half-hub 5b and bordered by axial projections forming dog claws 17.1. The plate of the first dog 17 comprises six through orifices 19, of a cylindrical shape, arranged to receive substantially adjustably the portions 15.2 of the pins 15 and thus to transmit to the wheel 1 a driving torque generated by an electric motor 100 driving in rotation about the axis X of a second dog 101 which is mounted to be movable between a first position interacting with the first dog 17 and a second position disengaged from the first dog 17. The orifices 19 have a diameter D slightly greater than the diameter d2 of the second portions 15.2 of the pin 15 and smaller than the diameter d3 of the collar 15.3. In the operating position, the dog plate 17 bears against the half-hub 5b so that the collars 15.3 are trapped in the counterbores 18 and thus limit the risk of the pins 15 being removed from the bores 16.

Figure 4:
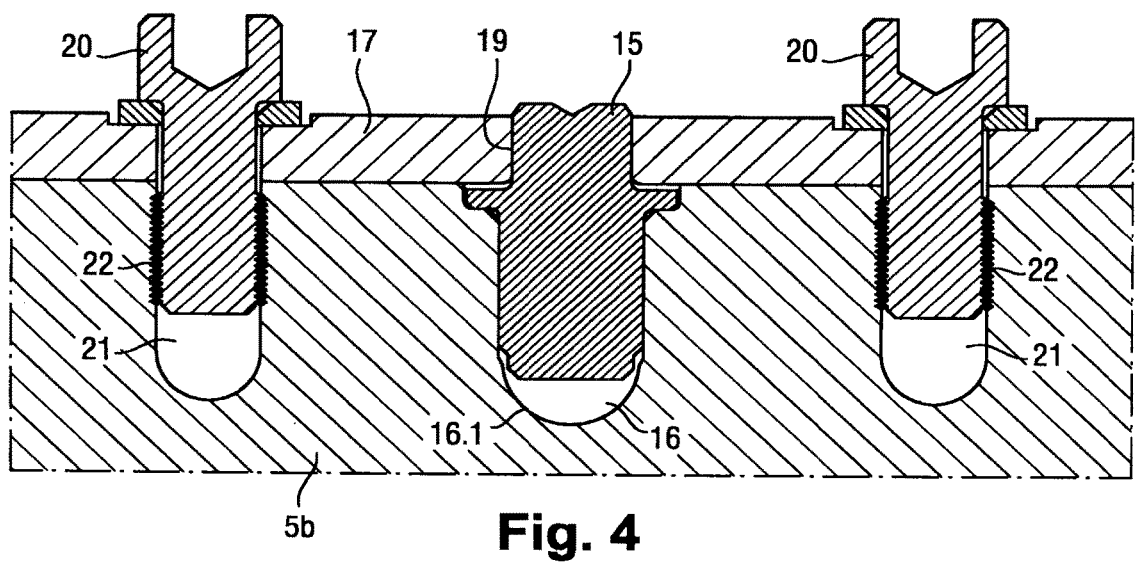
FIG. 4 is a partial view, in an axial section according to a plane IV-IV, of the aircraft wheel shown in FIG. 2.
Figure 5:
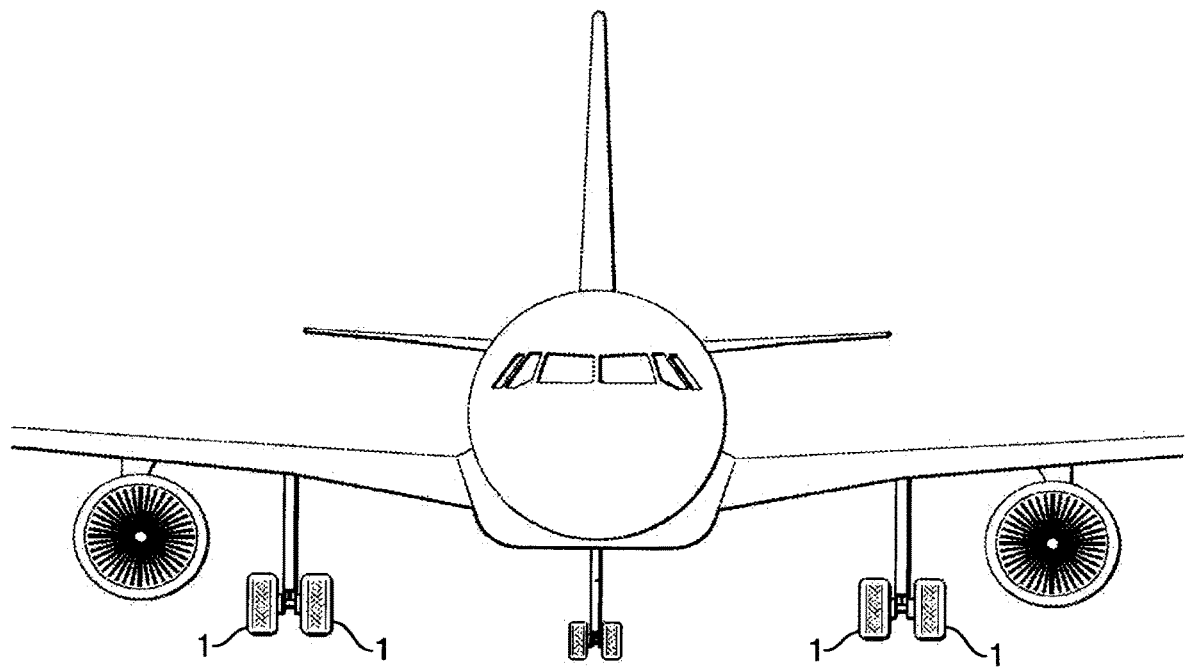
FIG. 5 is a front view of an aircraft including a landing gear having the aircraft wheel shown in FIG. 1.
Figure 6:
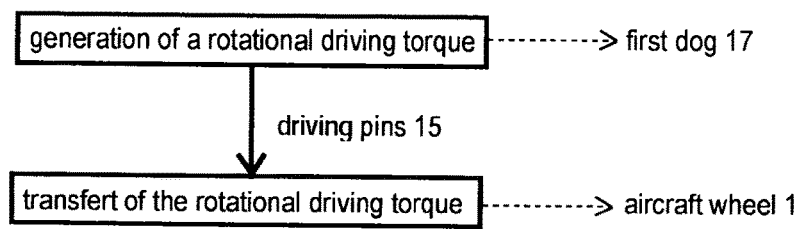
FIG. 6 is a view of a method for driving in rotation the aircraft wheel show in FIG. 1.

As illustrated in FIGS. 2 and 4, the first dog 17 is held in the operating position by twelve screws 20 surrounding the pins 15 in pairs. The screws 20 are screwed into threaded holes 21 provided for this purpose in the half-hub 5b. The centres of the screws 20 are inscribed on a same circle, the centre of which is situated on the axis X, and are aligned in pairs with the centres of the pins 15. The screws 20 pass through the plate of the first dog 17 via holes made in said plate in correspondence with the holes 21. In order to limit the risk of tearing off the threads of the threaded holes 21, attached threads 22 are installed in said holes 21, which makes it possible to increase the tightening forces induced by the screws 20. It should be noted that the clearance between the screws 20 and the holes made in the plate in order to receive them is greater than the clearance between the pins 15 and the holes made in the plate in order to receive them in such a manner that the torque is transmitted by the pins 15 and not by the screws 20.

Naturally, the invention is not limited to the described embodiments, but covers any variant coming within the scope of the invention as defined by the claims.

The rim can be made up of one or more pieces.

The number and the arrangement of the driving pins can be different from the described embodiment.

Although here the driving pins have a cylindrical cross-section, others shapes can be envisaged.

Although here the driving pins are force-fitted into the hub, other methods for fixing these pins can be envisaged (screwing, bolting, gluing, welding, etc.).

The shape and the dimensions of the first dog can be different.

Although here the wheel is made of aluminium and the pins are made of a nickel and chromium alloy, other materials can be used.

Other means for fixing the first dog on the half-rim can be envisaged (an elastic engagement of the clipping type, bolting, etc.).

The wheel of the invention is described above in application to an aircraft landing gear. It can of course be used with other types of vehicles and for example with land vehicles.

Although here the bottom of the bores is of a rounded shape, other shapes (tubular, frustoconical, etc.) can be envisaged.

The invention claimed is:

1. An aircraft wheel comprising two half-wheels assembled together by bolts, each of the half wheels comprising a half-rim, a half-hub defining an axis of rotation of the aircraft wheel, and a half-web securing the half-rim and the half-hub coaxially with each other, the bolts being arranged in facing orifices formed in the half-webs, the aircraft wheel comprising:
a first driving dog held in position on one of the half-hubs by screws screwed into holes provided on said one of the half-hubs, and
at least one driving pin that extends from said one of the half-hubs, projecting in a direction substantially parallel to the axis of rotation of the aircraft wheel so as to cooperate with first driving dog so that a rotational driving torque input into the aircraft wheel wheel via the first driving dog does not pass through the screws.

2. The aircraft wheel according to claim 1, wherein each of the at least one driving pin has a cylindrical shape and is force-fitted into a corresponding bore formed in the one of the half-hubs.

3. The aircraft wheel according to claim 2, wherein each of the at least one driving pin comprises a collar forming an abutment against the fitment of said at least one driving pin into the corresponding bore.

4. The aircraft wheel according to claim 3, wherein each of the bores includes a counterbore inside which the corresponding collar is housed.

5. The aircraft wheel according to claim 2, wherein each of the bores comprises a bottom having a rounded shape.

6. The aircraft wheel according to claim 1, wherein the at least one driving pin comprises a plurality of driving pins symmetrically distributed about the axis of rotation of the aircraft wheel.

7. An aircraft landing gear comprising:
an aircraft wheel according to claim 1, and
a driving device for driving the aircraft wheel in rotation, wherein the driving device includes an electric motor driving in rotation a second driving dog which is mounted to be movable between a first position interacting with the first driving dog to transmit to said aircraft wheel a driving torque generated by the electric motor, and a second position disengaged from the first driving dog.

8. The aircraft wheel according to claim 7, wherein each of the at least one driving pin comprises an end portion received in a corresponding orifice formed in the first driving dog.

9. An aircraft comprising a support structure on which is fixed an aircraft landing gear according to claim 7.

10. A method for driving in rotation an aircraft wheel according to claim 1, the method comprising:
applying a rotational driving torque to the first driving dog; and
transferring, via the at least one driving pin, the rotational driving torque to the aircraft wheel.

* * * * *